United States Patent
Conner et al.

(10) Patent No.: US 7,733,867 B2
(45) Date of Patent: Jun. 8, 2010

(54) HEADER COMPRESSION FOR REAL TIME INTERNET APPLICATIONS

(75) Inventors: Keith Faulk Conner, Boonton, NJ (US); Anil M. Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1078 days.

(21) Appl. No.: 11/211,605

(22) Filed: Aug. 26, 2005

(65) Prior Publication Data

US 2007/0047551 A1    Mar. 1, 2007

(51) Int. Cl.
*H04L 12/28* (2006.01)
*H04L 12/56* (2006.01)
*H04J 3/24* (2006.01)

(52) U.S. Cl. .................... 370/394; 370/474
(58) Field of Classification Search .......... 370/229, 370/230, 231, 235, 349, 389, 392, 394, 411, 370/412, 471, 474, 475, 466, 467

See application file for complete search history.

(56) References Cited

U.S. PATENT DOCUMENTS

| 6,118,784 | A  | * | 9/2000 | Tsuchiya et al. | ............. 370/401 |
| 6,999,429 | B1 | * | 2/2006 | Hannu et al. | ................. 370/328 |
| 7,009,951 | B2 | * | 3/2006 | Kalliokulju et al. | ......... 370/331 |
| 7,221,657 | B2 | * | 5/2007 | Bergenlid et al. | ............ 370/252 |
| 2004/0033801 | A1 | * | 2/2004 | Yi et al. | ...................... 455/428 |
| 2004/0095939 | A1 | * | 5/2004 | Yang | ...................... 370/395.52 |
| 2005/0287957 | A1 | * | 12/2005 | Lee et al. | ....................... 455/68 |
| 2006/0039358 | A1 | * | 2/2006 | Kim | ........................... 370/352 |
| 2007/0041382 | A1 | * | 2/2007 | Vayanos et al. | ............. 370/394 |

OTHER PUBLICATIONS

J. Postel, RF 768 (rfc768)—User Datagram Protocol, Aug. 28, 1980, pp. 1-3.
J. Sjoberg et al., "Real-Time Transport Protocol (RTP) Payload Format and File Storage Format for the Adaptive Multi-Rate (AMR) and Adaptive Multi-rate Wideband (AMR-WB) Audio Codecs", Network Working Group, Request for Comments: 3267, Category: Standards Track, Jun. 2002, pp. 1-35.
L-A. Larzon et al., "The Lightweight User Datagram Protocol (UDP-Lite), RFC 3828 (rfc3828)", Network Working Group, Request for comments: 3828, Category: Standards Track, Jul. 2004, pp. 1-9.
G. Pelletier, "Robust Header Compression (ROHC): Profiles for User Datagram Protocol (UDP) Lite", RFC 4019 (rfc4019), Network Working Group, Request for Comments: 4019, Category: Standards Track, Apr. 2005, pp. 1-16.
C. Bormann et al., "Robust Header Compression (ROHC): Framework and four profiles: RTP, UDP, ESP, and uncompressed", Network working Group, Request for comments: 3095, Category: Standards Track, Jul. 2001, pp. 1-121.

\* cited by examiner

*Primary Examiner*—Chirag G Shah
*Assistant Examiner*—Ashley L Shivers
(74) *Attorney, Agent, or Firm*—Harness, Dickey & Pierce, P.L.C.

(57) ABSTRACT

The disclosed techniques provide for eliminating real-time transport protocol, RTP, sequence number information and/or user data protocol, UDP, checksum information from the header of a packet for transmission.

14 Claims, 4 Drawing Sheets

HEADER COMPRESSION FOR REAL TIME INTERNET APPLICATIONS

BACKGROUND OF THE INVENTION

As the momentum for enabling voice over IP (VoIP) in 3G systems such as UMTS grows, operators will be concerned with maximizing the air interface capacity to maximize revenue. While VoIP simplifies core network design and adds new and valuable services compared to traditional circuit switch (CS) voice, VoIP also inherently adds additional overhead in the form of large headers.

FIG. 1 illustrates a well-known VoIP protocol stack for transmission in UMTS and the associated data at each layer in the stack. As shown, an AMR speech vocoder 10 encodes speech for transmission. For example, using an AMR 7.95 kbps vocoder, the vocoder delivers a 159 bit speech frame every 20 ms. To deliver this speech frame to an IP endpoint, the frame is encapsulated into a real-time transport protocol (RTP) packet at a RTP/RTCP layer, where RTCP refers to the radio transport control protocol. The RTP layer 12 adds 12 bytes of header to the speech frame, and the header conveys information such as sequence number, time stamp, synchronization source ID, etc. In addition, some padding is done for octet alignment.

Next, a user data protocol (UDP) and version 6 internet protocol (IPv6) layer 14 adds, according to UDP, another 8 bytes of header to indicate, for example, source/destination port numbers and a checksum (mandatory for IPv6); and then adds 40 bytes of header (e.g., routing information for each packet) according to IPv6.

Therefore the original 159 bit speech packet becomes 656 bits, which is an overhead of over 300%. Fortunately, it is not necessary to transmit the enormous header for each voice packet over the air interface all the time. 3GPP Release 5 mandates that the robust header compression (RoHC) specified in RFC 3095 be supported in the packet data convergence protocol (PDCP) layer 16 of UMTS. Namely, the PDCP layer 16 in the protocol stack for transmission will include a compressor 17 operating according to RoHC, while the PDCP layer in the protocol stack for reception will include a decompressor operating according to RoHC. As is known, the protocol stack for reception is opposite and complementary to the protocol stack for transmission, and is shown in FIG. 2.

The principle behind header compression is that most of the fields in the RTP/UDP/IPv6 header are static; hence they can be sent once uncompressed at call setup from the compressor on the transmission side to the decompressor at the reception side. Once the decompressor has reliably acquired the static information, the compressor starts sending compressed headers carrying information regarding the dynamic parts of the RTP/UDP/IPv6 header. From the compressed header the decompressor is able to fully reconstruct the RTP/UDP/IPv6 header and pass it on to the peer application. In this way, the large RTP/UDP/IPv6 headers are not transmitted over the UMTS air interface for each voice packet, leading to tremendous savings in capacity.

FIG. 3 illustrates the dynamic and static fields of the RTP, UDP, and IPv6 headers. The RTP, UDP and IPv6 protocols are well-known in the art as are the headers for these protocols and the fields comprising the headers. Accordingly, these protocols, headers and fields will not be described in detail. For RTP/UDP/IPv6, the compressed headers carry information regarding the sequence number, time stamp, M, and X fields in the RTP header, which are the dynamic RTP fields, and carry information regarding the UDP checksum, which is a dynamic field in the UDP header because it depends on the payload. During, for example, uninterrupted speech, the dynamic information in the RTP header can be further compressed in most situations down to a one byte R-0 header. The R-0 header is a well-known compressed header profile set forth by RoHC, and includes a single byte of information. This single byte of information includes 2 bits for packet identification and the 6 least significant bits (LSB) of the RTP sequence number.

As stated above, unfortunately, the 2 byte UDP checksum is uncompressible and sent in every voice packet over the air. While slightly larger headers are sent sometimes to update certain header fields, the vast majority of the time RoHC will operate with just 3 bytes of compressed header (1 byte R-0+2 bytes UDP checksum).

The output of the PDCP layer 16 is sent to the radio link control (RLC) layer 18. The RLC layer 18 may operate in a transparent mode or unacknowledged mode (UM). The unacknowledged mode is used in the packet switched (PS) domain of UMTS, and in this mode, an additional 1 byte of RLC UM header is added to the voice packet. This results in a total overhead of 4 bytes.

Subsequently, the medium access control (MAC)-d layer 20 performs transport format selection and routes the appropriate number of RLC packet data units (PDUs) from the RLC layer to the physical (PHY) layer 24. Unless logical channel multiplexing is used (not considered here), the MAC-d layer 20 does not add additional header overhead. In the case the high speed downlink packet access (HSDPA) channel is used in the downlink direction, packets flow from the MAC-d layer 20 to the MAC-hs layer 22, which performs user scheduling, rate selection, and hybrid automatic repeat request (HARQ). In case the enhanced dedicated channel (E-DCH) is used in the uplink direction, then packets flow from the MAC-d layer 20 to the MAC-e layer 22, which performs rate selection, multiple flow multiplexing, and HARQ. The MAC-hs/MAC-e layer 22 header size is variable, but typically adds approximately 20 bits of header when carrying a single MAC-d PDU. Finally, the physical (PHY) layer 24 adds its own error detection mechanism by attaching CRC bits, and transmits the data packet over the air.

Focusing just on the RoHC overhead of 3 bytes, this results in a 15% overhead in the size of each voice packet for an AMR 7.95 kbps vocoder, and a 20% overhead for AMR 5.9 kbps vocoder. Therefore even with RoHC, there is a significant penalty to pay when carrying voice over IP.

SUMMARY OF THE INVENTION

The present invention provides techniques to further reduce or compress the resulting RoHC header on the transmission side and decompress the header on the reception side.

In at least one embodiment, the one-byte RTP header that would remain after conventional RoHC is eliminated.

In at least other embodiments, the UDP checksum that would remain after conventional RoHC is eliminated.

In a further embodiment, both of these techniques are employed, which results in a zero-byte RoHC header, referred to as zero-byte header compression.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

Next, embodiments of the present invention will be described in detail. First, methods of compressing and decompressing the R-0 header portion of the compressed RoHC header will be described. Then, methods of compressing and decompressing the UDP checksum portion of the UDP header will be described.

Compressing and Decompressing the R-0 Header

Figure 1:
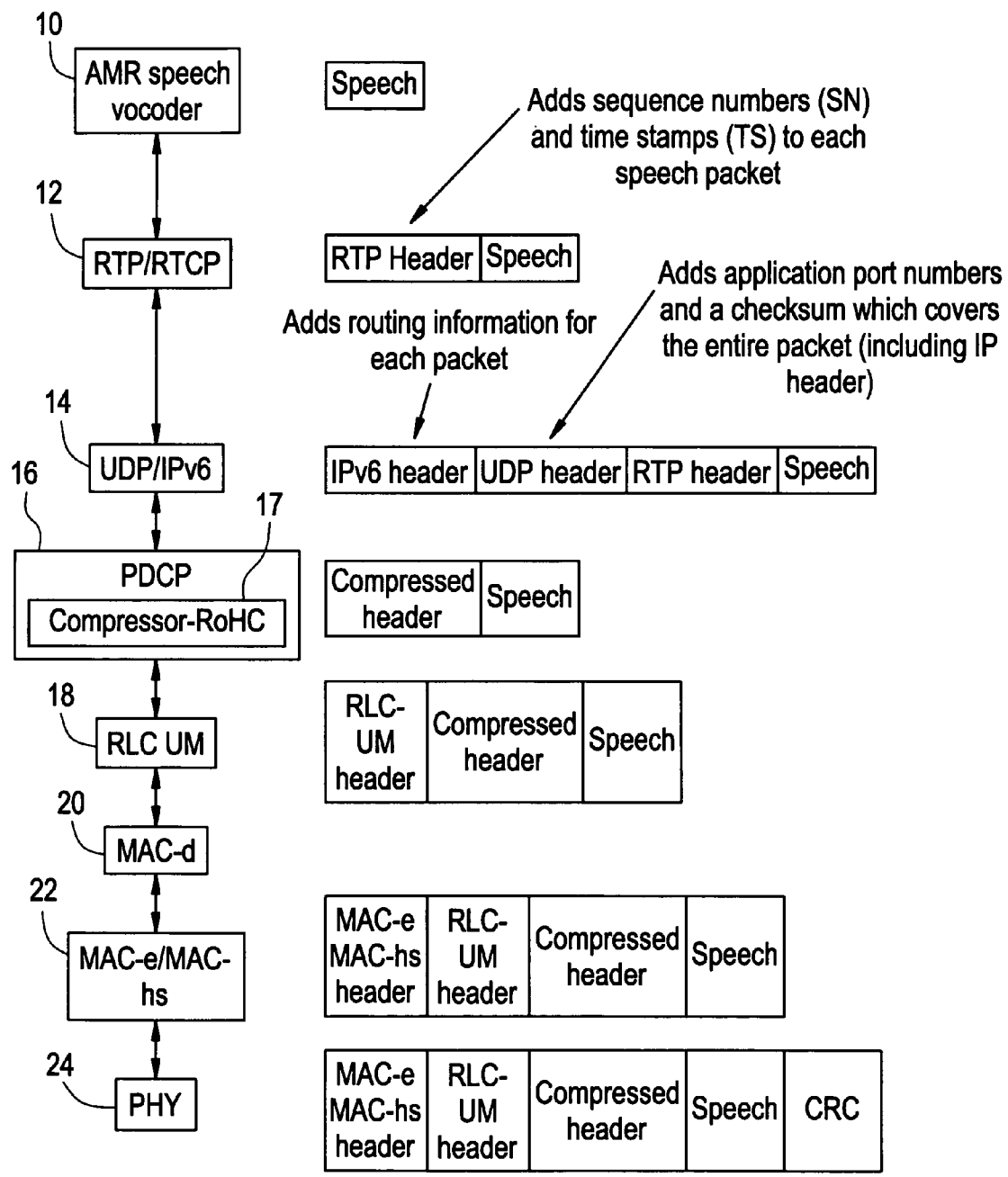
FIG. 1 illustrates a well-known VoIP protocol stack for transmission in a UMTS system and the associated data at each layer in the stack.

Referring to FIG. 1, the RLC UM layer 18 in UMTS places sequence numbers in the RLC UM header to detect missing packets. Note that in UMTS, in-order delivery is guaranteed by lower layers, even for HS-DSCH and E-DCH transport channels. As the only point of the 6 bit LSB in the R-0 header (i.e., type of compressed RTP header discussed above) is to reconstruct the RTP sequence number, this can be accomplished equivalently using the already provided 7 bit sequence number in the RLC UM header; assuming that the RTP packets are delivered in order to the RoHC compressor. In order delivery to the RoHC compressor can be assumed on the uplink, as the RTP packets are generated in the user equipment (UE) itself. However, on the downlink it is certainly possible for the RTP packets to arrive out of order at the radio access network (RAN) from the IP network, and the RAN may then transmit the RTP packets out of order.

Accordingly, compression of the R-0 header on the uplink will first be described followed by compression of the R-0 header on the downlink.

Uplink

Compression

In the uplink, packets are delivered to the RoHC compressor in the UE in order. Accordingly, the RLC UM sequence numbers will set forth the same packet order as the RTP sequence numbers. Accordingly, in this embodiment, the compressor 17 at the PDCP layer 16 is modified to eliminate the R-0 header, which includes the 2 bit packet identifier and the 6 least significant bits of the sequence number for the RTP packet.

Decompression

Figure 2:
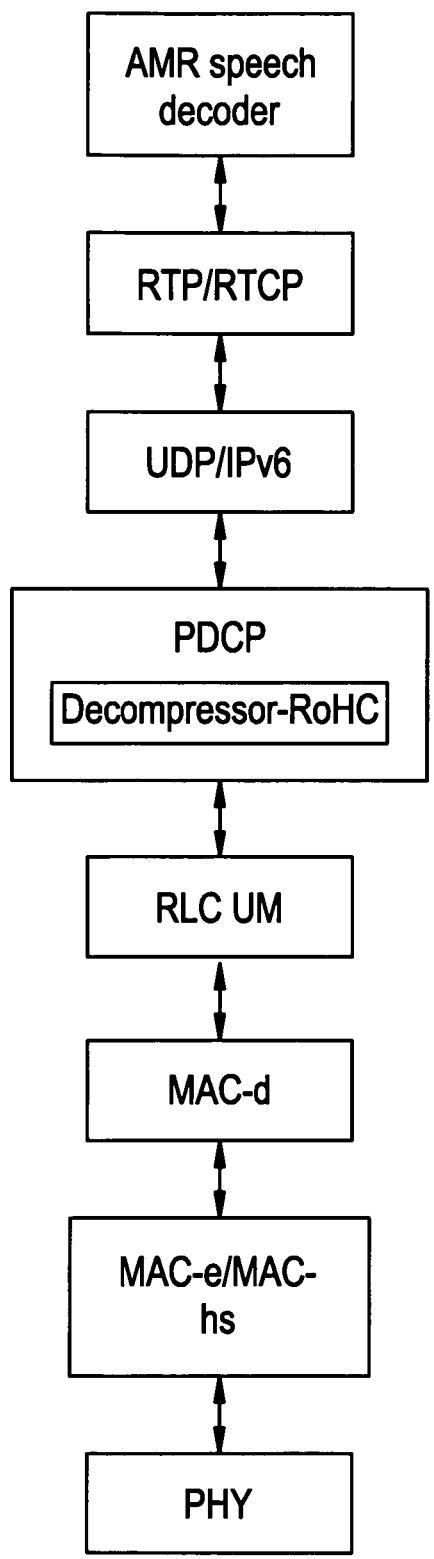
FIG. 2 illustrates a well-known VoIP protocol stack for reception in a UMTS system.

As discussed above, the protocol stack for reception is opposite and complementary to the protocol stack for transmission. This is shown in FIG. 2. Accordingly, for reception, the protocol stack is modified so that the RLC UM sequence number is delivered from the RLC layer to the PDCP layer, which includes the RoHC decompressor. The decompressor may then use the RLC UM sequence number to reconstruct the RTP sequence number. As discussed in detail above, packets are initially sent uncompressed. As such the decompressor learns the RLC UM sequence number and corresponding RTP sequence number, and may calculate the offset there between. Upon receiving the RLC UM sequence number in a compressed packet, the decompressor adds the offset to the RLC UM sequence number to obtain the RTP sequence number. The decompressor may then reconstruct the original RTP header, and the decompressor may continue with the RoHC decompression for the other headers (UDP/IPv6 headers).

Alternatively, given that the RTP sequence numbers are used to identify missing RTP packets, and hence it is the relative sequence numbers between packets that really matters and not the absolute sequence number, the RLC UM sequence number may be used directly for the purpose of generating an RTP sequence number to use in the reconstructed RTP header. For example, in one embodiment, the RTP sequence number could be reconstructed by using as its 6 least significant bits the 6 least significant bits of the RLC UM sequence number. As another example, no reconstruction takes place, and instead the RLC UM sequence numbers are supplied to the algorithm for detecting missing RTP packets or the algorithm for dealing with missing RTP packets (e.g., an algorithm that corrects for the missing RTP packets in some manner).

Downlink—First Embodiment

Compression

Figure 4:
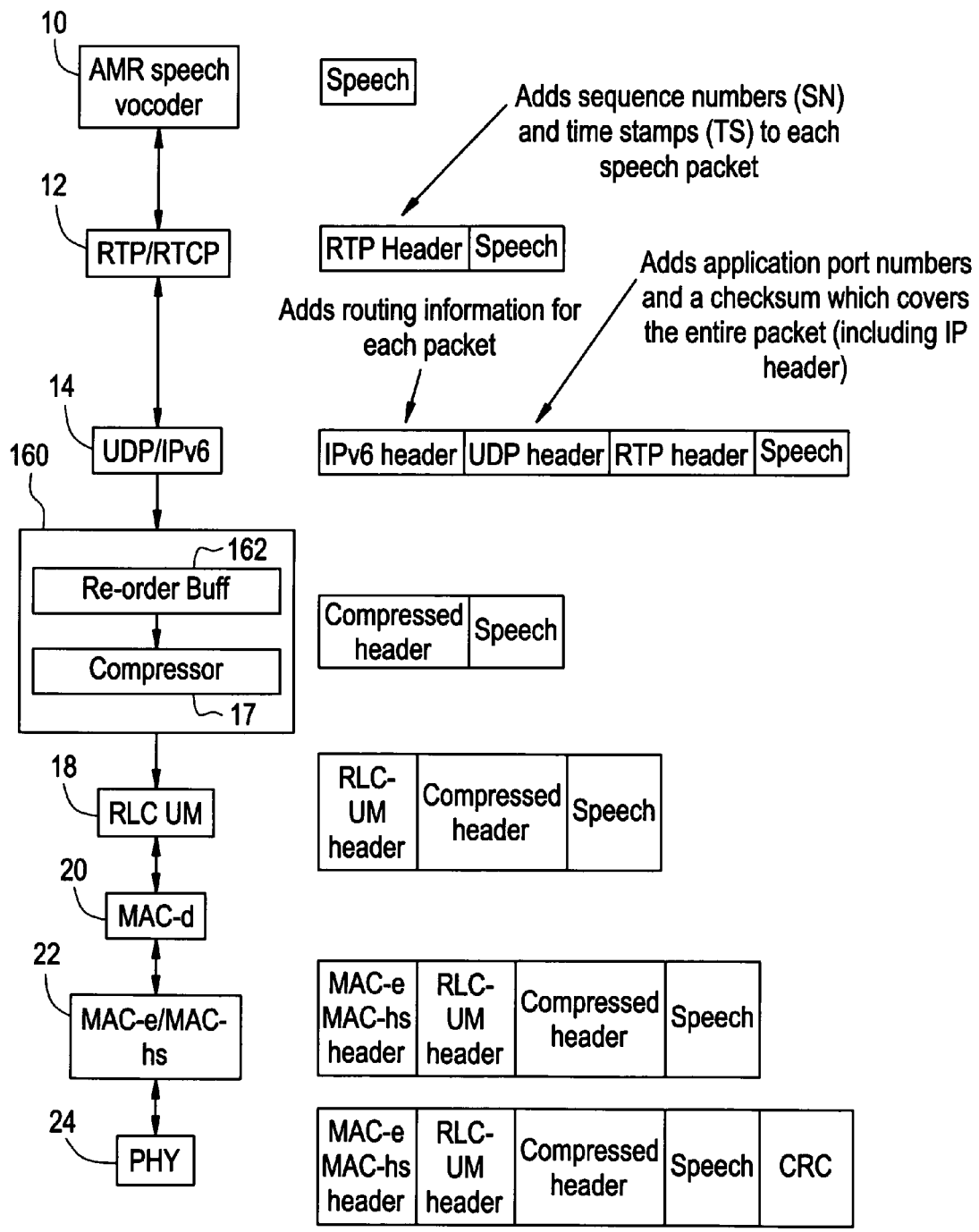
FIG. 4 illustrates the VoIP protocol stack of FIG. 1 modified according to an embodiment of the present invention.

In a first embodiment for compression of the RoHC R-0 header in the downlink, the PDCP layer for transmission is modified to include a reordering buffer. FIG. 4 illustrates the protocol stack of FIG. 1 with a PDCP layer 160, which is modified from FIG. 1 by including a reordering buffer 162 according to this embodiment of the present invention. The RTP/UDP/IPv6 packets from the UDP/IPv6 layer 14 are stored in the re-ordering buffer 162, and PDCP including RoHC compression is applied to the RTP/UDP/IPv6 packets in order of their RTP sequence numbers. Namely, the RTP sequence number for each packet will be read in the PDCP layer 160, and the reordering buffer 162 is used to output the packets in order to the RoHC compressor 17. Because the packets flow through the protocol stack in order after the PDCP layer 160, the RLC UM sequence number applied at the RLC UM layer 18 will coordinate with the RTP sequence numbers as in the uplink case described above. Therefore, compression/elimination of the R-0 header may then take place as described above in the uplink case.

Decompression

Because the packets are in order, the RLC UM sequence numbers may used by the decompressor at the reception side in the same manner described above with respect to the uplink case.

Downlink—Second Embodiment

Compression

In this second embodiment, the PDCP layer 16 may be modified to influence the determination of the RLC UM sequence number. More specifically, the PDCP layer 16 may send an indication to the RLC UM layer 18 indicating an out of order or missing RTP sequence number. Namely, the PDCP layer 16 may monitor the sequence of RTP sequence numbers and convey this sequence to the RLC UM layer 18. In this manner, out of order or missing RTP sequence numbers are communicated to the RLC UM layer 18. The RLC UM layer 18 may then generate RLC UM sequence numbers such that the sequence of RLC UM sequence numbers corresponds to the sequence of RTP sequence numbers. For example, the sequence of RLC UM sequence numbers will be out of order or missing in the same manner as the sequence of RTP sequence numbers. As such, the R-0 header may then be eliminated by the compressor 17 at the PDCP layer 16.

Decompression

On the reception side, the RoHC decompressor may properly regenerate the RTP sequence numbers or follow any of the other embodiments described above with respect to decompression on the uplink. Also, the RLC UM protocol may need to be amended to allow a mode which can deliver packets out of order to higher layers to avoid additional delay.

Compressing and Decompressing the UDP Checksum

Figure 3:
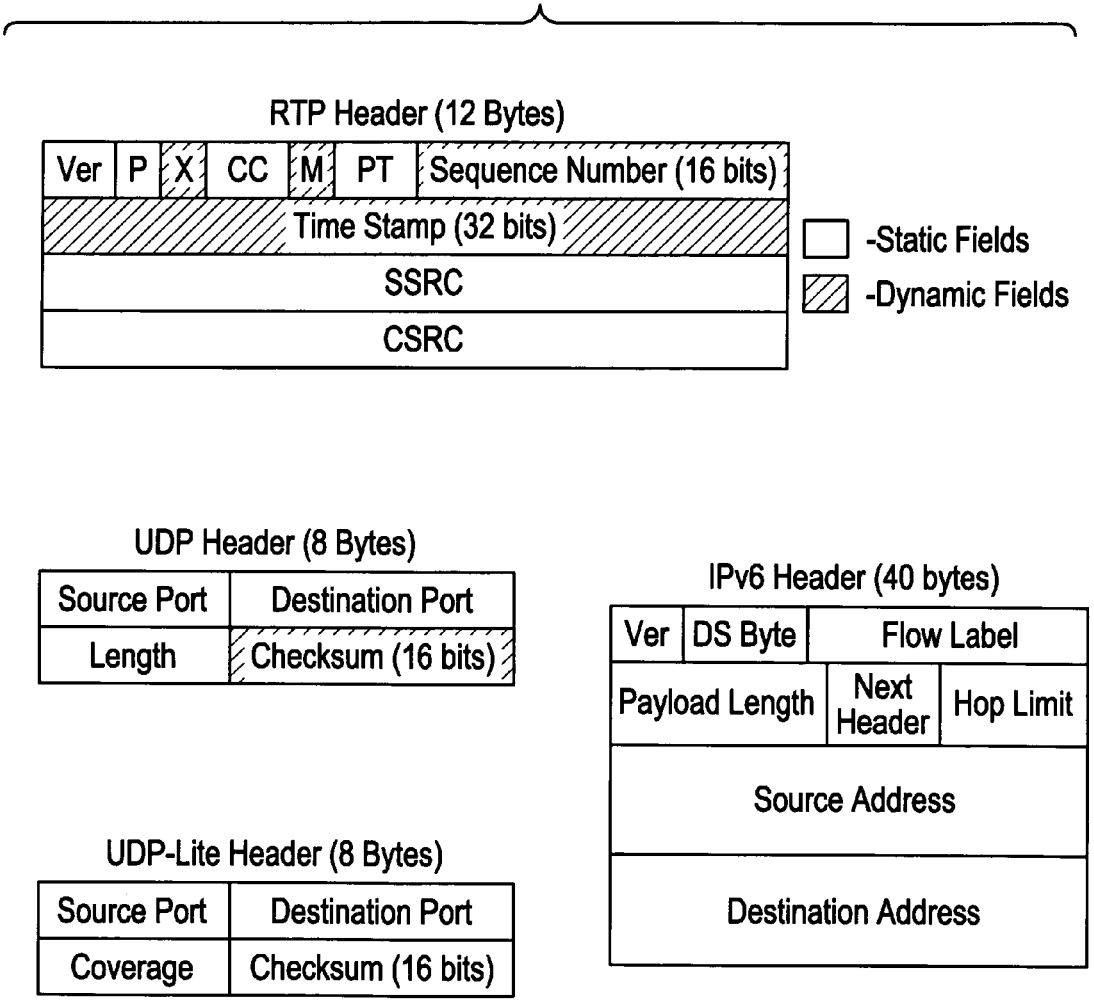
FIG. 3 illustrates the dynamic and static fields of the RTP, UDP, and IPv6 headers.

The UDP checksum is mandatory with IPv6, hence there is no option to disable the UDP checksum (as is possible in IPv4). The IETF has recognized that certain applications (such as voice and real-time video) can benefit by having damaged data delivered rather than having the packets discarded by the network. Hence, the IETF has introduced UDP-Lite, which provides a partial checksum for the UDP payload that allows only a specific portion of the payload, such as the UDP-Lite and IP headers, to be checked for errors. The UDP-Lite header is well-known and illustrated in FIG. 3.

The advantage in having only the UDP-Lite and IP header covered by the checksum is that these fields are static as far as RoHC is concerned, and therefore, the UDP-Lite checksum is also static. Accordingly, these headers are initially sent uncompressed to the decompressor, and thereafter, the need to send the UDP checksum with every voice packet is eliminated. The IETF RFC 4019 defines the RoHC profile for UDP-Lite. For VoIP, it is not expected that the coverage field of the UDP-Lite header would change during the session, hence the entire UDP-Lite header becomes static and fully compressible.

Unfortunately, not all applications would necessarily choose to use UDP-Lite, nor is it guaranteed that UDP-Lite is available as a transport mechanism. In those cases, regular UDP may be used and the UDP checksum would not be static; forcing the transmission of the UDP checksum over the air interface with every voice packet. For this situation, two embodiments will be described below that avoid having to send the UDP checksum over the air interface.

First Embodiment

Compression

According to this embodiment, on the transmission side, the compressor 17 may be modified to strip off the UDP checksum, and the data packet is sent without the UDP checksum. In another variation of this embodiment, the RoHC compressor 17 may be modified to first verify the checksum to make sure that the checksum does not fail before sending the packet. If the checksum fails the packet is dropped at the compressor 17. However, if the checksum is verified, then the checksum may be stripped off during compression.

Decompression

At the reception side, the decompressor may be modified to re-compute the checksum. The checksum is generated as specified in the UDP. Namely, the RoHC decompressor mimics the UDP layer and re-computes the checksum based on the received packet. The computed checksum is then inserted into the UDP header to fully reconstruct the UDP header.

Both the compression and decompression methodologies discussed above may be employed for the uplink and the downlink.

Second Embodiment

A second embodiment of the present invention enforces the use of UDP-Lite to avoid sending the UDP checksum over the air interface.

Compression

In this embodiment, the compressor 17 in the PDCP layer 16 may be modified to convert regular UDP to UDP-Lite. To convert UDP to UDP-Lite, the compressor 17 overwrites the 2-byte length field in the UDP header to form the 2-byte coverage field in UDP-Lite, changes the IP identifier in the IPv6 header to a value of indicating UDP-Lite (e.g., 136 in IPv6), re-computes a checksum based on a desired coverage, and replaces the UDP checksum with the re-computed checksum. The 2-byte length field in regular UDP now becomes a 2-byte coverage field for the checksum in UDP-Lite, and the RoHC compressor can specify that the coverage of the checksum is only the UDP-Lite and IP headers. As the checksum is now a static value (does not depend on dynamic information), it no longer needs to be sent over the air interface with every voice packet. Namely, the RoHC will eliminate the checksum along with the rest of the UDP-Lite header.

Decompression

At the reception side, if the application that will receive the packet (e.g., the peer application) supports UDP-Lite, then the decompressor may operate in the conventional manner. However, if the application that will receive the packet only supports UDP, then the decompressor may operate in a modified manner and convert UDP-Lite to UDP. Namely, the decompressor changes the IP identifier in the IPv6 header to indicate UDP, re-computes the UDP checksum to cover the entire packet, replaces the UDP-Lite checksum with the UDP checksum, and overwrites the 2-byte coverage field with the 2-byte length information required for the UDP header.

The compression and decompression methods may be employed on the uplink and the downlink. However, in another embodiment, support for UDP-Lite may be made mandatory in the UE (e.g., mobile phone, PDA, computer, etc.). Since the UE supports UDP-Lite from requirement, when transmitting, no conversion to UDP-Lite is required. And, when receiving, no conversion to UDP from UDP-Lite is required. Namely, the UE will be able to operate properly, not ever knowing that the original application was using regular UDP and not UDP-Lite.

CONCLUSION

As will be appreciated, the compression and decompression methods for eliminating the R-0 header and the UDP checksum may be employed together such that together with conventional RoHC, the RTP/UDP/IPv6 header is completely eliminated. For an AMR 7.95 kbps vocoder, the addition of the techniques according to the present invention result in an additional 15% reduction in overhead. For an AMR 5.9 kbps vocoder, the reduction in overhead is an additional 20%. This reduction in overhead can be used to allow for greater VoIP capacity over the UMTS air interface.

The invention being thus described, it will be obvious that the same may be varied in many ways. Such variations are not to be regarded as a departure from the invention, and all such modifications are intended to be included within the scope of the invention.

We claim:

1. A method of compressing a header of a packet for transmission, comprising:

monitoring a sequence of real-time transport protocol, RTP, sequence numbers to identify at least one of missing or out of order packets;

compressing, by a compressor, a RTP header portion of the packet by eliminating the RTP sequence number from the RTP header portion; and generating radio link control RLC unacknowledged mode UM sequence numbers for packets after the compressing step based on the monitoring step such that a sequence of RLC UM sequence numbers corresponds to the monitored sequence of RTP sequence numbers.

2. The method of claim 1, further comprising:

performing robust header compression on the packet such that the resulting compressed header includes a compressed RTP header portion, and the compressed RTP header portion includes a number of bits conveying the RTP sequence number; and wherein the compressing step eliminates the bits conveying the RTP sequence number from the compressed RTP header portion.

3. The method of claim 2, wherein the compressed RTP header portion includes a packet type identifier and a number of bits conveying the RTP sequence number; and wherein the compressing step eliminates the packet type identifier and the bits conveying the RTP sequence number.

4. The method of claim 1, further comprising:

storing packets in a buffer; and outputting the stored packet in sequence for compression according to the RTP sequence numbers of the packets.

5. A method of decompressing a header of a received packet, comprising:

reconstructing, by a decompressor, a real-time transport protocol, RTP, sequence number for an RTP header portion of the received packet based on a received radio link control, RLC, unacknowledged mode, UM, sequence number associated with the packet; and sending, by the decompressor, reconstructed packets to higher layers in a protocol stack even if the reconstructed RTP sequence numbers are not in order, wherein the reconstructing step combines a previously determined offset with the RLC UM sequence number to obtain the RTP sequence number.

6. The method of claim 5, wherein the reconstructing step uses the RLC UM sequence number as the RTP sequence number.

7. A method of decompressing a header of a received packet, comprising:

generating, by a decompressor, a user data protocol, UDP, checksum for the received packet;

inserting, by the decompressor, the generated UDP checksum into a UDP header portion of the received packet;

reconstructing, by the decompressor, a real-time transport protocol, RTP, sequence number for an RTP header portion of the received packet based on a received radio link control, RLC, unacknowledged mode, UM, sequence number associated with the packet; and sending, by the decompressor, reconstructed packets to higher layers in a protocol stack even if the reconstructed RTP sequence numbers are not in order, wherein the reconstructing step combines a previously determined offset with the RLC UM sequence number to obtain the RTP sequence number.

8. A method of compressing a header of a packet for transmission, comprising:

converting a user data protocol, UDP, portion of the packet to UDP-Lite; and compressing, by a compressor, the packet according to the robust header compression, RoHC, wherein the converting step comprises:

overwriting a length in a UDP header portion of the UDP portion with a coverage field according to UDP-Lite;

changing an internet protocol, IP, identifier in an IP header portion of the packet to a value indicating UDP-Lite;

generating a checksum for a coverage indicated by the coverage field; and replacing a UDP checksum in the UDP header portion with the generated checksum.

9. The method of claim 8, wherein the coverage field indicates a UDP-Lite header portion and the IP header portion as the coverage.

10. The method of claim 8, wherein the compressing step further comprises:

compressing a real-time transport protocol, RTP, header portion of the packet by eliminating a RTP sequence number from the RTP header portion.

11. A method of decompressing a header of a received packet, comprising:

converting a user data protocol-Lite, UDP-Lite, portion of the received packet to UDP; and decompressing, by a decompressor, the received packet according to robust header compression, RoHC, wherein the converting step comprises:

overwriting a coverage field in a UDP-Lite header portion of the UDP-Lite portion with a length field according to UDP;

changing an internet protocol, IP, identifier in an IP header portion of the packet to a value indicating UDP;

generating a UDP checksum for the received packet; and replacing a UDP-Lite checksum in the UDP-Lite header portion with generated UDP checksum.

12. The method of claim 11, wherein the converting step converts the UDP-Lite portion of the received packet to UDP only if an application to which the received packet is destined does not support UDP-Lite.

13. The method of claim 11, further comprising:

reconstructing a real-time transport protocol, RTP, sequence number for an RTP header portion of the received packet based on a received radio link control, RLC, unacknowledged mode, UM, sequence number associated with the packet.

14. The method of claim 1, wherein the RLC UM sequence number for packets uses the same packet order as the RTP sequence number.

* * * * *